United States Patent
Bettenwort et al.

(10) Patent No.: US 8,860,358 B2
(45) Date of Patent: Oct. 14, 2014

(54) METHOD FOR OPERATION OF A PHOTOVOLTAIC GENERATOR AT AN OPERATING POINT OF MAXIMUM POWER

(71) Applicant: SMA Solar Technology AG, Niestetal (DE)

(72) Inventors: Gerd Bettenwort, Kassel (DE); Jens Klein, Goettingen (DE); Markus Hopf, Espenau (DE)

(73) Assignee: SMA Solar Technology AG, Niestetal (DE)

(*) Notice: Subject to any disclaimer, the term of this patent is extended or adjusted under 35 U.S.C. 154(b) by 0 days.

(21) Appl. No.: 13/748,707

(22) Filed: Jan. 24, 2013

(65) Prior Publication Data

US 2013/0134955 A1     May 30, 2013

Related U.S. Application Data (63) Continuation of application No. PCT/EP2011/063878, filed on Aug. 11, 2011.

(30) Foreign Application Priority Data

Aug. 12, 2010 (DE) .......................... 10 2010 036 966

(51) Int. Cl.
   *H01M 10/44*     (2006.01)
   *G05F 5/00*     (2006.01)
   *G05F 1/67*     (2006.01)

(52) U.S. Cl.
   CPC .. *G05F 5/00* (2013.01); *G05F 1/67* (2013.01); *Y02E 10/58* (2013.01)
   USPC .............................. 320/101; 307/80; 323/274

(58) Field of Classification Search
   USPC ............... 320/101, 110, 140, 148, 150, 155; 323/222, 225, 271–275, 299, 906; 702/60, 61, 65, 54, 189
   See application file for complete search history.

(56) References Cited

U.S. PATENT DOCUMENTS 5,747,967 A * 5/1998 Muljadi et al. ................ 320/148
6,057,665 A     5/2000 Herniter et al.

(Continued)

FOREIGN PATENT DOCUMENTS

| CN | 1627225 A | 6/2005 |
|---|---|---|
| EP | 1635438 A2 | 3/2006 |
| ES | 2326200 A1 | 10/2009 |
| WO | 2009140551 A2 | 11/2009 |

OTHER PUBLICATIONS

Zbeeb et al. liMproves photovoltaic MPPTalgorithim adapted for un stable atmospheric conditions and partial shading, Clean Electric Power Conf. IEEE, Pscataway, NJ USA, Jun. 9, 2009, pp. 320-323,XP031517629.*

(Continued)

*Primary Examiner* — Rajnikant Patel
(74) *Attorney, Agent, or Firm* — Eschweiler & Associates, LLC (57) ABSTRACT

A method includes searching for a point of maximum power based on a systematic load variation, setting the point of maximum power as the operating point of the photovoltaic generator, and tracking the operating point based on a load variation with a narrow variation range. The method also includes analyzing operating variables of the photovoltaic generator to determine the level of probability that the operating point deviates from the point of maximum power, selectively interrupting the tracking and carrying out another search to determine the point of maximum power as a function of the analysis of the operating variables, and setting the point of maximum power as the operating point, and resuming the tracking. The method further takes into account previous searches carried out in the presence of comparable operating variables to determine the probability.

16 Claims, 7 Drawing Sheets

(56) References Cited

U.S. PATENT DOCUMENTS

| | | | |
|---|---|---|---|
| 6,608,404 B2* | 8/2003 | Schienbein et al. | 307/82 |
| 6,984,967 B2* | 1/2006 | Notman | 323/282 |
| 7,042,195 B2* | 5/2006 | Tsunetsugu et al. | 320/101 |
| 7,701,083 B2* | 4/2010 | Savage | 307/29 |
| 7,991,511 B2* | 8/2011 | Zhang et al. | 700/286 |
| 2006/0055366 A1 | 3/2006 | Tsunetsugu et al. | |
| 2013/0175862 A1* | 7/2013 | Kelly | 307/24 |

OTHER PUBLICATIONS

"Maximum Power Point Tracking Schemefor PV System Operating Under Partially Shaded Condition", IEEE Trans. on Industrial Electronics. vol. 55, No. 4, 2008, pp. 1669-1698.*

Esram, Chapman: "Comparison of Photovoltaic Array Maximum Power Point Tracking Techniques." IEEE Transactions on Energy Conversion, vol. 22, No. 2, Jun. 2007. 12 Pages.

Patel, Agarwal: "Maximum Power Point Tracking Scheme for PV Systems Operating Under Partially Shaded Conditions." IEEE Transactions on Industrial Electronics, vol. 55, No. 4, Apr. 2008. 10 Pages.

Zbeeb, et al. "Improved Photovoltaic MPPT Algorithm Adapted for Unstable Atmospheric Conditions and Partial Shading." IEEE Transactions on Industrial Electronics, vol. 55, No. 4, presented in 2008. 4 Pages.

International Search Report and Written Opinion of the International Searching Authority dated Feb. 22, 2012 for International Application No. PCT/EP2011/063878. 14 Pages.

* cited by examiner

METHOD FOR OPERATION OF A PHOTOVOLTAIC GENERATOR AT AN OPERATING POINT OF MAXIMUM POWER

REFERENCE TO RELATED APPLICATIONS

This application is a continuation of international application number PCT/EP2011/063878 filed on Aug. 11, 2011, which claims priority to German Application number 10 2010 036 966.7 filed on Aug. 12, 2010.

FIELD

The invention relates to a method for operation of a photovoltaic generator at an operating point of maximum power, which method comprises a search for the point of maximum power on the basis of systematic load variation with a wide variation range, setting the point of maximum power as the operating point of the photovoltaic generator, and tracking the operating point on the basis of a load variation with a narrow variation range.

BACKGROUND

In the presence of incident light, photovoltaic generators produce electrical energy. Inverters are required in order to allow DC voltage produced by the photovoltaic generators to be fed into a public supply grid system. The operating point of the photovoltaic generator is continuously tracked by variation of the power output by means of a tracking device, also referred to as a maximum power point (MPP) tracker, for operational management of this inverter, such that the photovoltaic generator is operated as far as possible all the time at the point of maximum power output. An MPP tracker such as this for this purpose varies the current (I) drawn or the voltage (U) produced by the photovoltaic generator by a small amount, in each case calculates the power (P) as the product of the current and the voltage, and, possibly readjusts the current value or voltage value in the direction of higher power. The desired optimal operating point is formed by the global maximum of the P/U characteristic or the P/I characteristic.

An overview of miscellaneous known tracking methods for MPP tracking devices is provided by the article "Comparison of Photovoltaik Array Maximum Power Point Tracking Techniques", IEEE Transactions on Energy Conversion, Vol. 22, No. 2, pages 439-449, 2007.

If a photovoltaic generator is partially shadowed, two or more local maxima typically occur in the P/U or P/I characteristic. When using MPP tracking, it is possible in this case for the operating point to be readjusted to a local maximum, which is not necessarily also the global maximum, at which the photovoltaic generator should preferably be operated. In practice, depending on the history of the occurrence of shadowing, this can lead to yield losses if the MPP tracker "winds" to a local maximum, and remains there.

In this case, it is known for the tracking mode of the MPP tracker to be interrupted at predetermined regular time intervals, and for a systematic search to be carried out for the global maximum on the P/U characteristic. By way of example, a search such as this can be based on the recording of a U/I characteristic which extends at least over the range within which the global maximum can be expected. The global maximum which is found in the search is then used as the initial operating point for the tracking mode, which is subsequently resumed. Although this does not make it possible to prevent energy losses resulting from the operating point tracking a local maximum, it does reduce them, however, since the dwell time at a local maximum is restricted to the time interval between two successive searches.

However, energy losses also occur unavoidably when searching for the global maximum since the operating point differs from the global maximum for the majority of the search time when searching for the operating point. The magnitude of these energy losses increases with the search frequency while, in contrast, the risk of potential energy losses resulting from dwelling at a local maximum falls with the search frequency. Every value for the search frequency therefore represents only a compromise, which is suitable for keeping the energy losses low only in specific incident radiation conditions.

The article "Maximum Power Point Tracking Scheme for PV Systems Operating Under Partially Shaded Conditions", IEEE Transactions on Industrial Electronics, Vol. 55, No. 4, pages 1689-1698, 2008, discloses a method for operation of a photovoltaic generator at an operation point of maximum power wherein the power of the photovoltaic generator is monitored for sudden changes during the tracking operation. If an observed rate of change exceeds a given rate of change that is considered to be critical, a search for a global MPP is initiated. Thus, a sudden power change is seen as an indication that a search for a global MPP is required. Accordingly, the frequency of performing a search for a global MPP is highly dependent on the value of the predetermined critical rate, which itself usually is specific to the photovoltaic generator and has to be determined manually.

SUMMARY

One aspect of the disclosure is therefore to provide an optimized method for operation of a photovoltaic generator at an operating point of maximum power, in which the energy losses are as low as possible independent of predetermined generator-specific settings.

This optimization is achieved by a method of the type mentioned initially, which comprises a tracking method and a search method which has the following acts. Operating variables of the photovoltaic generator are analyzed in order to determine the level of probability of the operating point deviating from the point of maximum power. The tracking method is interrupted depending on a result of the analysis of the operating variables, and the search method is carried out in order to determine the point of maximum power. The point of maximum power is then set as the operating point, and the tracking method is resumed. The method further takes into account a result of previous search methods, which were carried out in the presence of comparable operating variables, in order to determine the probability of the operating point deviating from the point of maximum power.

Through the analysis of the operating variables to determine the probability of the operating point deviating from the point of maximum power it can be achieved that the search method is carried out only when there is a high probability of the energy losses linked to the search being more than compensated for by the energy gains to be expected as a result of changing the operating point to the point of maximum power. By taking into account the result of previous search methods in one embodiment, the method is independent of predetermined generator-specific settings that have to be determined manually.

In an advantageous embodiment of the method, the analyzed operating variables are recorded during the tracking of the operating point. Thus, a search for the global MPP can be initiated while tracking the MPP.

In a further advantageous embodiment of the method, a power and/or a voltage and/or a current of the photovoltaic generator are/is analyzed as an operating variable or operating variables. The named parameters are thus well suited to determine the probability that energy losses due to carrying out the search method will be compensated by the energy gains.

In a further advantageous embodiment of the method, a tolerance range is predetermined for the operating variables, and in which the search method is started subject to the precondition that the operating variables are outside the tolerance range.

In yet a further advantageous embodiment of the method, a tolerance range is predetermined for a rate of change of the operating variables, and in which the search method is started subject to the precondition that the rate of change of the operating variables is outside the tolerance range.

In yet a further advantageous embodiment of the method, a tolerance range is predetermined for a dependency of different operating variables on one another, and in which the search method is started subject to the precondition that the dependency of the operating variables on one another is outside the tolerance range. It is desirable in one embodiment that the dependency of various operating variables on one another is a quotient of the change of a first operating variable and the change of a second operating variable when the first or second operating variable is varied.

In these advantageous embodiments the comparison of determined operating values or related quantities with predetermined tolerance ranges provides a handle for controlling the method.

It is in these cases furthermore desirable in one embodiment that a latency time is provided, with the search method being started subject to the precondition that the tolerance range is left for a time period which is longer than the latency time. In a further embodiment, the length of the latency time itself depends on operating variables of the photovoltaic generator. In yet a further embodiment, the length of the latency time is determined taking account of the probability.

In a further advantageous embodiment of the method, the result of the previous search method is a probability with which the previous search methods have each led to setting of a different operating point, taking account of the respective operating variables.

In a further advantageous embodiment of the method, the result of the previous search method is an expected value of the respective new operating point or an expected value of operating variables of the photovoltaic generator at the respective new operating point, with which the previous search methods had each led to setting of a different operating point, taking account of the respective operating variables. In one embodiment, the determination of the probability is being carried out taking account of a discrepancy between the expected value and corresponding operating variables of the photovoltaic generator.

These embodiments provide direct and straightforward ways of considering the result of previous search methods.

In a further advantageous embodiment of the method, parameters of radiation that is incident on the photovoltaic generator are analyzed as an operating variable. In one embodiment the parameters relate to a radiation direction. Further, the radiation direction is determined based on a time. The incident radiation is as well an operating variable of the photovoltaic generator and influences whether energy losses due to carrying out the search method will be compensated by an energy gain due to a changed point of operation.

BRIEF DESCRIPTION OF THE DRAWINGS

The disclosure will now be explained in more detail using embodiments and with reference to the attached drawings, in which, in this case.

DETAILED DESCRIPTION

Figure 1:
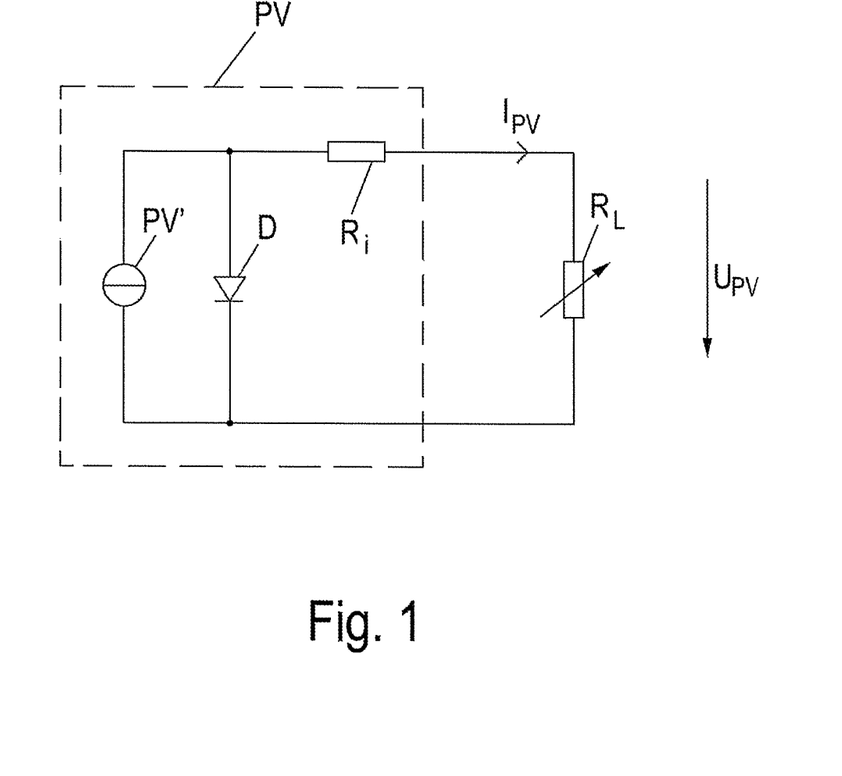
FIG. 1 shows an example of an equivalent circuit of a photovoltaic installation.

FIG. 1 shows an example of an equivalent circuit of a photovoltaic installation for energy production.

A photovoltaic generator PV which, for example, comprises one or more strings which in turn each have a plurality of series-connected photovoltaic modules is illustrated as an ideal current source PV', which is connected in parallel with a diode D and in series with an internal resistance Ri. A variable load RL is connected to the photovoltaic generator PV, through which load RL the current $I_{PV}$ from the photovoltaic generator PV flows, and across which a voltage $U_{PV}$ is dropped.

The photovoltaic generator is generally followed as a variable load $R_L$ by a device, for example, an arrangement which is referred to overall as an "inverter" comprising, for example, a DC/DC converter and a DC/AC converter. The inverter is used primarily to convert the direct current (DC) produced by the PV generator to an alternating current (AC), which can be fed into a supply grid system. Furthermore, the operating point is set to the point of maximum power at the input to the DC/DC converter, also referred to for short in the following text as the MPP (maximum power point), on a power/voltage characteristic (P/U characteristic) of the photovoltaic generator PV.

Figure 2:
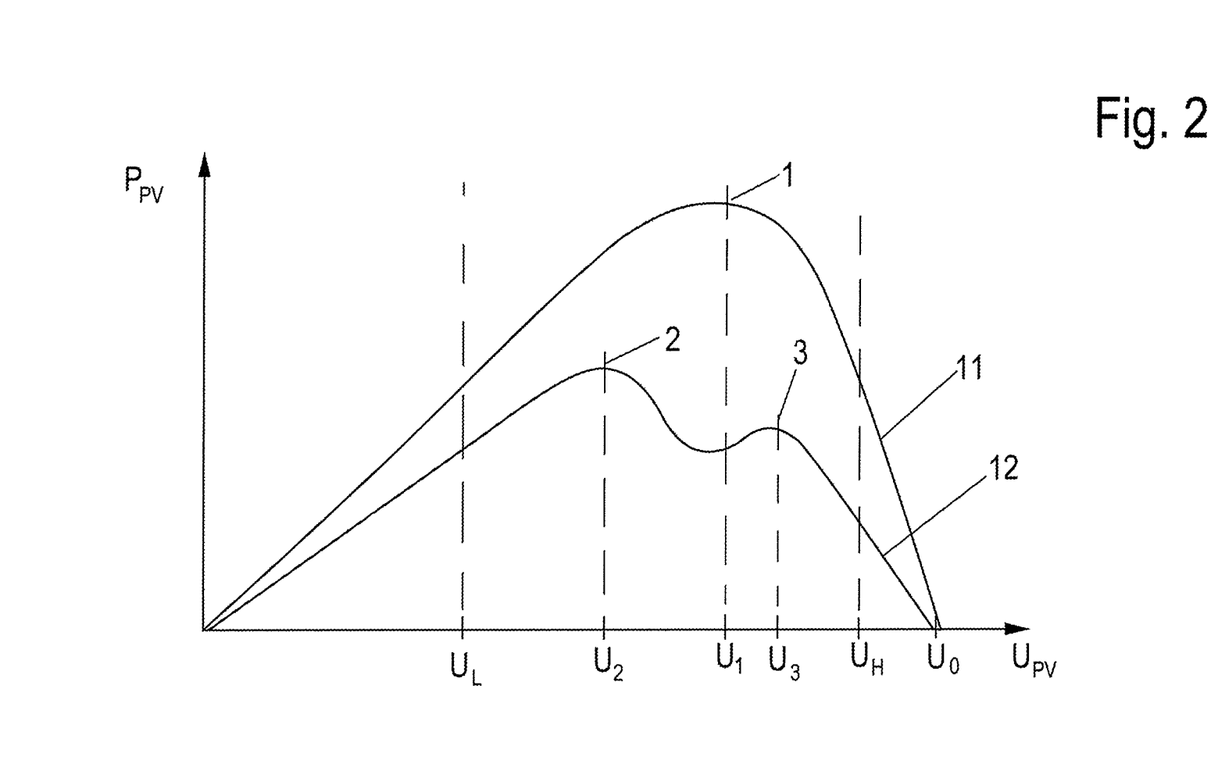
FIG. 2 shows an illustration, in the form of a graph, of examples of P/U characteristics of a photovoltaic generator.

FIG. 2 shows a schematic illustration of examples of P/U characteristics of a photovoltaic generator PV. A rated characteristic 11 of an unshadowed photovoltaic generator PV normally has a maximum when the voltage $U_{PV}$ is varied from zero to the maximum voltage, which is also referred to as the no-load voltage $U_0$. This maximum between 0 and $U_0$ is referred to in the following text as the global maximum 1.

FIG. 2 also shows an actual characteristic 12 as an example of a P/U characteristic in the case of partial shadowing of the photovoltaic generator. In general, partial shadowing leads to a plurality of maxima occurring in the P/U characteristic. In the present case, the maxima 2, 3 are formed at different levels. Of these, the maximum 2 also represents a global maximum, and is therefore referred to in the following text as the global maximum 2. In contrast, the maximum 3 is a maximum only locally, and is correspondingly referred to as a local maximum 3.

Two different sub-methods are used to determine the best operating point, a search method and a tracking method. A control device for operational management of an inverter can correspondingly be operated in two modes, a search mode and a tracking mode. Both sub-methods and both modes are each known in their own right in widely differing forms.

One form of each of the two sub-methods is illustrated in the following text, with reference to FIG. 3. At this point, it should be noted that, in order to simplify the explanation, the following description is based on a voltage preset. It is, of course, possible to convert the method to a current preset.

Figure 3:
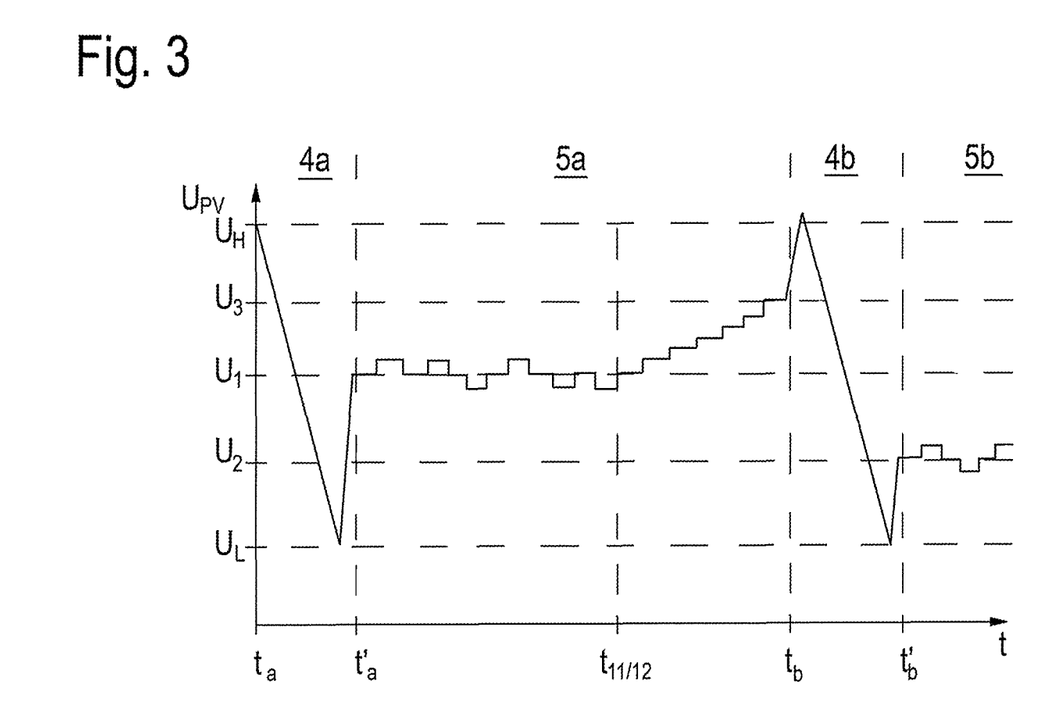
FIG. 3 shows an illustration, in the form of a graph, of an example of a time profile of a voltage of a photovoltaic generator in a first embodiment of a method for operation of a photovoltaic generator.

FIG. 3 shows the profile of the voltage $U_{PV}$ of the photovoltaic generator as a function of the time t during a search method 4 or a tracking method 5.

A first run a of the search method 4 is first of all carried out in a time period $t_a < t < t_a'$. In this first run a of the search method 4, the voltage $U_{PV}$ of the photovoltaic generator, also referred to as the operating voltage, is passed through continuously (or quasi-continuously in the case of digitally controlled methods) from a predetermined lower limit value $U_L$ to an upper limit value $U_H$, by appropriate load variation. The lower and the upper limit values $U_L$, $U_H$ are in this case chosen such that they bound the part of the operating range of the photovoltaic generator, within which the MPP can typically be expected, for example a range from between 25 and 80% of the no-load voltage $U_0$. During the run, the current $I_{PV}$ produced by the photovoltaic generator is measured, and the power output is determined as the product of $U_{PV}$ and $I_{PV}$, and its magnitude is recorded as a function of the voltage $U_{PV}$. The recorded measured values are used to determine the global maximum as the MPP, and to change the operating point to this value. By way of example, FIG. 3 is based on the assumption that the photovoltaic generator is not shadowed during the time of the first search 4a, and has the rated characteristic 11 as shown in FIG. 2. The global maximum 1 is correspondingly found as the MPP, and the associated voltage $U_1$ is changed to as the new operating voltage.

The tracking method 5 is then carried out for the first time (a) from the time $t=t_a'$. For this purpose, the voltage $U_{PV}$ is varied in small steps of predetermined magnitude toward higher and lower voltage values, and the newly resultant power value after the variation is compared with that which previously existed. If the power has increased, another step change is carried out in the voltage in the same direction (that is to say toward higher or lower voltage) after a likewise predetermined short waiting time. If the power has not changed or has deteriorated in response to the variation, the previous voltage value is adopted again. In this way, the operating voltage oscillates about the voltage value of the MPP, that is to say in the present case first of all about the value of the voltage $U_1$.

If the position of the MPP varies, without any qualitative change to the P/U characteristic, the operating voltage follows the position of the MPP during the tracking method. The position of the MPP is shifted, for example, in the event of heating, although in principle the P/U characteristic retains its characteristic and, for example, the number of maxima also does not change. In a situation such as this, the tracking method ensures that the photovoltaic generator is operated at the MPP.

However, in situations in which the characteristic of the P/U characteristic changes fundamentally, the tracking method can no longer ensure this. A change in the characteristic results, for example, owing to the occurrence of a plurality of maxima in the event of partial shadowing. It is assumed that such shadowing, which leads to a change from the rated characteristic 11 to the actual characteristic 12 shown in FIG. 2, starts from a time $t_{11/12}$ in FIG. 3. When the two maxima 2, 3 are formed, the tracking method follows one of the two maxima that are formed—but not necessarily the greater of the two. In the present case, the operating voltage rises continuously, which indicates that the tracking method is following the local maximum 3, and not the global maximum 2, when the two maxima 2, 3 are formed.

Operating variables of the photovoltaic generator are determined and analyzed in order to estimate the probability of the operating point deviating from the global MPP. Depending on the results of this analysis, the tracking method is interrupted, and a further run of the search method is carried out, if there is a high probability of the operating point deviating from the global MPP and of the renewed search leading to a better operating point, which is associated with an energy gain, which more than compensates for the energy loss resulting from carrying out the search. As described in the last paragraphs of this description, a result of previous search methods, which were carried out in the presence of comparable operating variables, is taken into account in order to determine the probability of the operating point deviating from the point of maximum power.

In the example illustrated in FIG. 3, the tracking method 5a is interrupted at the time $t_b$, and a further run (b) of the search method 4 is started. This is carried out analogously to the first run (a) of the search method 4 as described above, and leads to the global maximum 2 being found, and to the operating point being set to the associated voltage $U_2$. After conclusion of the search method and changing to the new operating point, the tracking method 5 is resumed at the time $t_b'$ (annotated as 5b in the figure).

In a first embodiment, which is illustrated with reference to FIG. 3, the change in the voltage $U_{PV}$ of the photovoltaic generator while tracking the operating point is analyzed as an operating variable. The rate of change (change in the voltage per unit time) is in this case a measure of the probability of the tracked operating point deviating from the MPP. The background is that processes which leave the characteristic of the P/U characteristic unchanged, such as the heating of the photovoltaic generator, for example, take place over a longer time scale than the change from an unshadowed photovoltaic generator to a partially shadowed photovoltaic generator. By way of example, it is possible to form a sliding mean value of the rate of change of the voltage $U_{PV}$ during the tracking process, and to initiate the search method 4 if this rate of change exceeds a predetermined value. By way of example, the sliding mean value of the rate of change can be determined by considering a predetermined number of previous steps for voltage variation during the tracking method 5, for example 18 steps, and by initiating the search method 4 when, of the predetermined number of steps, a specific proportion of the steps, for example ⅔ of the steps, tends in the same direction (voltage increase or voltage decrease). In the illustrated example, this proportion is exceeded at the time $t_b$, and the tracking method 5a is interrupted for carrying out the search method 4b.

Figure 4:
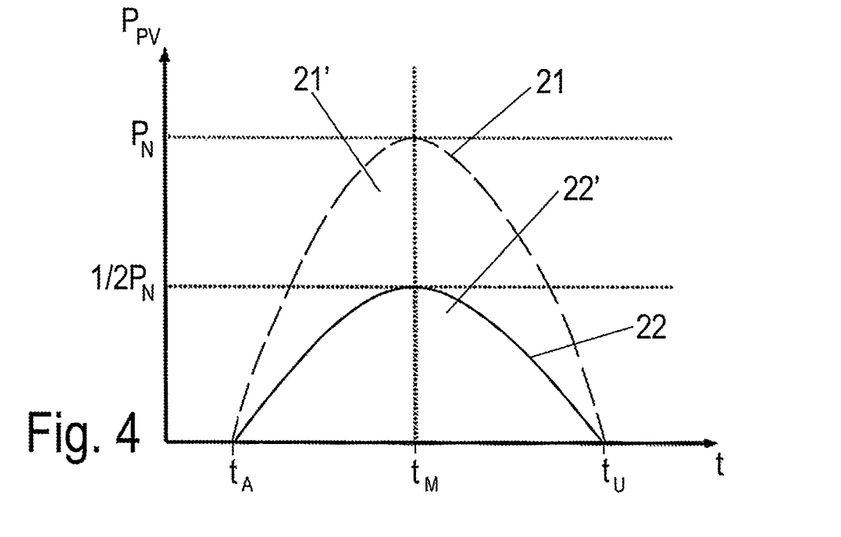
FIG. 4 shows a diagram of the expected power of a photovoltaic generator as a function of the time of day, in order to illustrate a further embodiment of the method.

A second embodiment of a method for operation of a photovoltaic generator PV at its operating point of maximum power will be described with reference to FIGS. 4 and 5. FIG. 4 illustrates the power $P_{PV}$ produced by a photovoltaic generator PV as a function of the time t over the course of the day. In this case, the time $t_A$ marks the time of sunrise, the time $t_M$ noon, and the time $t_U$ the time of sunset. The rated power of the photovoltaic generator $P_N$ as well as half this value are shown as horizontal lines on the ordinate of the diagram.

To a good approximation, the maximum power output from a photovoltaic generator has a parabolic profile following the time of day. A parabolic profile such as this, with a parabola which is open at the bottom and whose peak value is reached at noon, is shown as the dashed rated power curve 21 in FIG. 4. The rated power curve 21 is achieved only in ideal conditions when the photovoltaic generator is unshadowed. The times of sunrise and sunset $t_A$ and $t_U$ as well as the maximum rated power at the peak point of the parabola are dependent on the time of year. The corresponding parameters for production of the rated power curve 21 can either be predetermined in tabular form, or can be constructed from data measured on a previous day or a plurality of previous days. For example, a threshold value curve 22 can be created from the expected rated power curve 21 by multiplication by a predetermined factor less than unity. In the present example, the predetermined factor is 0.5, as a result of which the threshold value curve 22 has its peak point at the time $t_M$, at half the rated power.

In this refinement of the method, the power $P_{PV}$ of the photovoltaic generator PV is determined, and compared with the threshold value curve 22, while the tracking method 5 is being carried out. If the power $P_{PV}$ falls below the value of the threshold value curve 22, and therefore out of a tolerance range 21' into the range 22' shown in the diagram in FIG. 4, the tracking method 5 is interrupted, and the search method 4 is run in order to determine the MPP. As in the previously described example, once the search has been completed, the corresponding point of maximum power that has been found is set as the new operating point for the photovoltaic generator PV, and the tracking method 5 is continued using this operating point. In this case, it is possible for the search method 4 to be started only if the specified criterion is satisfied for more than a predetermined time period (latency time). For this purpose, the power $P_{PV}$, compared with the threshold value curve 22, can be carried out before the comparison, via an integrator, for example a low-pass filter.

Figure 5:
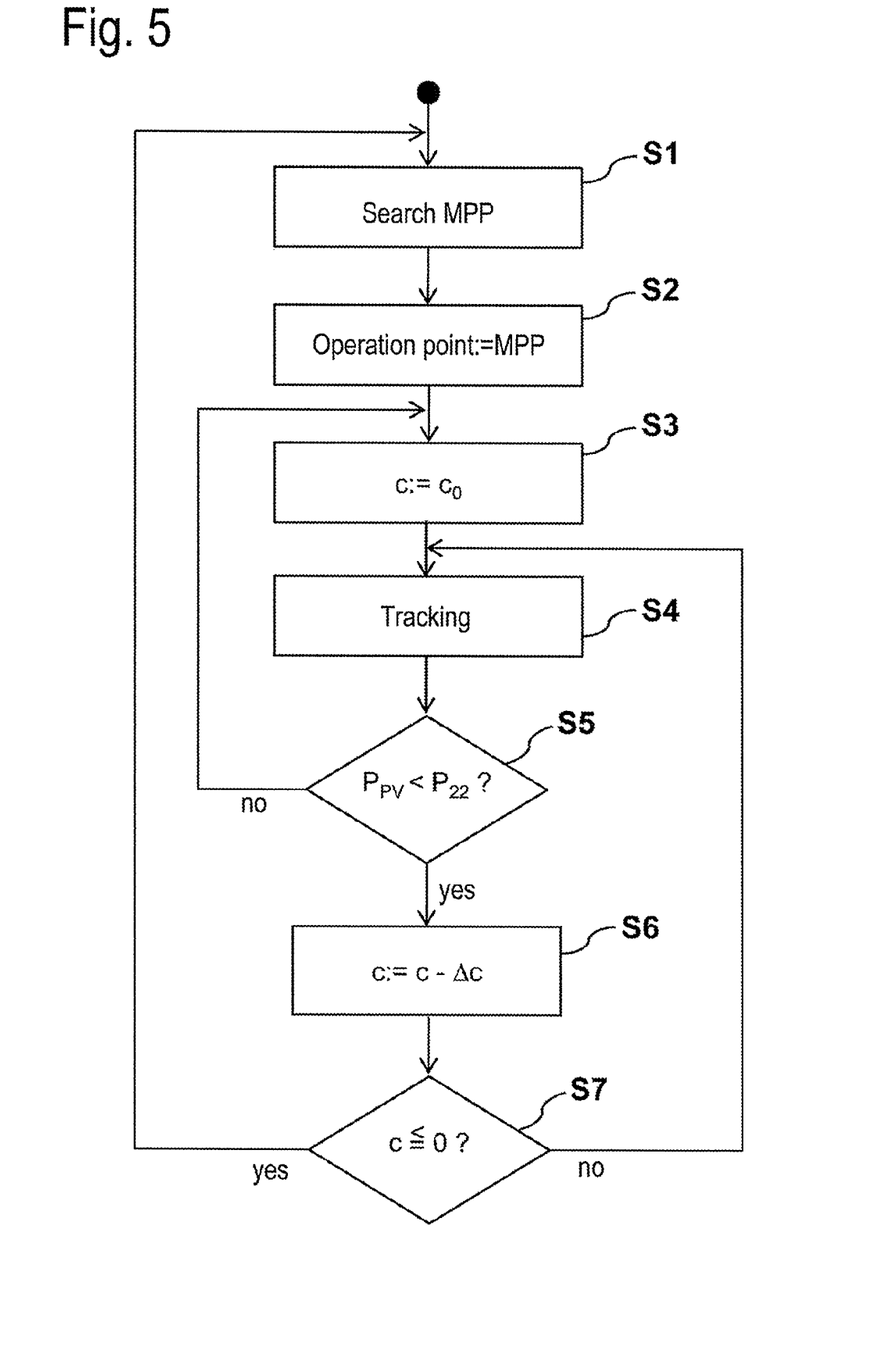
FIG. 5 shows a flowchart of the further embodiment of the method as illustrated in FIG. 4.

In one alternative refinement of the method, a latency time such as this is provided with the aid of a counter, as will be described in the following text using the flowchart as shown in FIG. 5, and with reference to FIG. 4.

At S1, a search is carried out for the point of maximum power, the MPP. At S2, the operating point for operation of the photovoltaic generator is set to the point of maximum power found at S1. In detail, S1 and S2 can in this case be carried out as described above in conjunction with FIG. 3.

Subsequently, at S3, a counter c is initialized at an initial value $c_0$, for example, the initial value $c_0$=360. At S4, a tracking method for tracking the operating point of the MPP is carried out for a predetermined time period, for example, for one second. Reference is also made in this context to the details which have already been described above.

Subsequently, at S5, the power of the photovoltaic module $P_{PV}$ is compared with the threshold value power $P_{22}$ based on the threshold value curve 22 (cf. FIG. 4). If the power $P_{PV}$ is not less than the corresponding value on the threshold value curve 22, the method jumps back to S3, where the counter c is once again set to the initial value $c_0$. The tracking method is then continued, effectively without any interruption, by carrying out S4 again.

However, if it is found at S5 that the power $P_{PV}$ is less than the corresponding threshold value power $P_{22}$ from the threshold value curve 22, that is to say that the power $P_{PV}$ is within the range 22' in FIG. 4, the method is continued at S6, in which the count of the counter c is decremented by a predetermined value $\Delta c$, for example by the value 1.

A check is then carried out at S7 to determine whether the counter c has reached the count 0. If this is not the case, the method jumps back to step S4, by continuing the tracking method again.

If it is found at S7 that the count 0 has been reached, the method jumps back to the start, in order once again to carry out a search for the global power maximum MPP at S1.

In the method according to one embodiment, a new search process is initiated by the counter C only after a latency time of 6 minutes, within which the power must be continuously in the range 22', when using the values stated by way of example of 360 for the initial value $c_0$ and 1 for the counter decrement $\Delta c$ per interval of 1 s. This ensures that neither brief power fluctuations, which are not caused by tracking at a local maximum, nor brief disturbances in the measurement of the operating variables can initiate a search. At the same time, this means that a search is not carried out too frequently even when there is an increased probability of an operating point with higher power being found if another search were carried out. In this case, in an alternative refinement, it is possible for the counter c not to be reset to the initial value $c_0$ whenever the threshold value curve 22 is exceeded, but only to be increased by a predetermined counter increment in the predetermined interval, with the count being restricted to the initial value $c_0$ as the maximum value. It is likewise feasible for the counter c to be decremented such that the search for a global power maximum MPP is carried out after a time period which is dependent on the operating variables. In this case, the prediction of the probability of a search being successfully carried out is taken into account over this time period.

Figure 6:
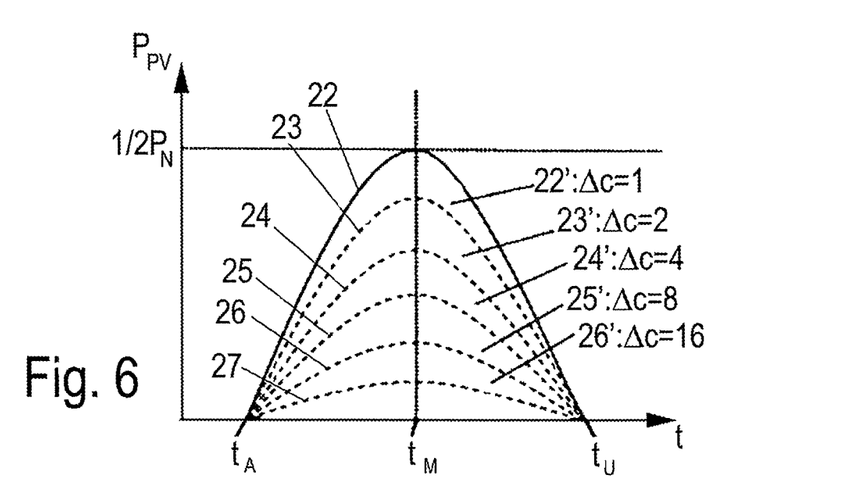
FIG. 6 shows an illustration of an expected power of a photovoltaic module over the course of the day, in order to illustrate an alternative refinement of the embodiment shown in FIG. 5.

In a further refinement, the latency time can be made dependent on measured operating variables of the photovoltaic generator PV by introducing a plurality of threshold value curves. This is illustrated in FIG. 6, analogously to the illustration in FIG. 4.

The figure shows a family of threshold value curves 22 to 27, of which the curve 22 actually corresponds to the threshold value curve 22 in FIG. 3. The further threshold value curves 23 to 26 are created in the same manner, from the rated power curve 21 (cf. FIG. 4, not illustrated here), but will be factors which become increasingly smaller.

In a method which corresponds to that illustrated in FIG. 5, in this refinement, the magnitude of the counter decrement $\Delta c$ (act S6 in FIG. 5) is made dependent on the measured power $P_{PV}$ of the photovoltaic generator PV. If $P_{PV}$ is in the range 22' between the threshold value curve 22 and the threshold value curve 23, then $\Delta c$=1. If $P_{PV}$ is in contrast lower and is in the range 23' between the threshold value curve 23 and the threshold value curve 24, the counter decrement is $\Delta c$=2. As the power decreases, the decrement rises to the values 4, 8 and 16, as can be seen in FIG. 6. Both the number of steps, that is to say the number of basic threshold value curves 22 to 27, and the associated magnitude of the counter decrement $\Delta c$ should in this case be understood only as examples. Overall, the method illustrated in FIG. 6 leads to the latency time for carrying out the search being decreased as the discrepancy between the power and the expected rated power of the photovoltaic generator increases. The greater the discrepancy is, the more frequently the tracking method is interrupted and a new search for the MPP is initiated. In this case, it is likewise feasible to carry out a continuous determination process, by calculation from the abovementioned operating variables, instead of a discrete choice of counter decrements $\Delta c$.

The first embodiment of the method, described with reference to FIG. 3, inherently already has a latency time, which is governed by the number of steps in the tracking method which are analyzed for a change in their direction. In this case, a dependency of the latency time on the variable under consideration itself can be introduced by the process for initiating the search method also taking account of the extent to which the distribution of the voltage steps differs, in terms of their direction (voltage increase or voltage decrease) from a uniform distribution.

In the methods described in conjunction with FIGS. 4 to 6, which are based on an analysis of the power as an operating variable of the photovoltaic generator, it is feasible in one possible alternative refinement to additionally take account of the power variation. This is based on the knowledge that major fluctuations in the power produced by a photovoltaic generator supposedly indicate changing cloud cover. In a situation such as this, it is frequently better to accept a possible energy loss by possibly tracking a local minimum during the cloud-coverage phase, which in any case will last for only a short time, than to initiate a search. This refinement therefore provides for the initiation of the search method 4 to be suppressed when a greatly changing power level is detected. By way of example, a greatly changing power level can be detected by continuously detecting the power over the duration of a predetermined time period, for example of one minute, forming the relative difference between a measured maximum and a measured minimum power, and by comparing this difference with a predetermined threshold value, for example 2%. As long as the relative difference, as a measure of the power fluctuation, exceeds this threshold value, the tracking method 5 is not interrupted, and no search method is initiated. The magnitude of the determined power fluctuation can furthermore be included in the latency time. For example, it is possible to choose a counter decrement $\Delta c$ to be greater the less the determined power fluctuation is since, if the power fluctuation is otherwise small, a dip in the power below a threshold value curve is a stronger indication of shadowing.

At this point, it should be noted that suppression of the initiation of the search method in this way can be carried out in all of the embodiments of the method proposed within the scope of this application, and not only in the case of those which use the power as the operating variable under consideration.

Figure 7:
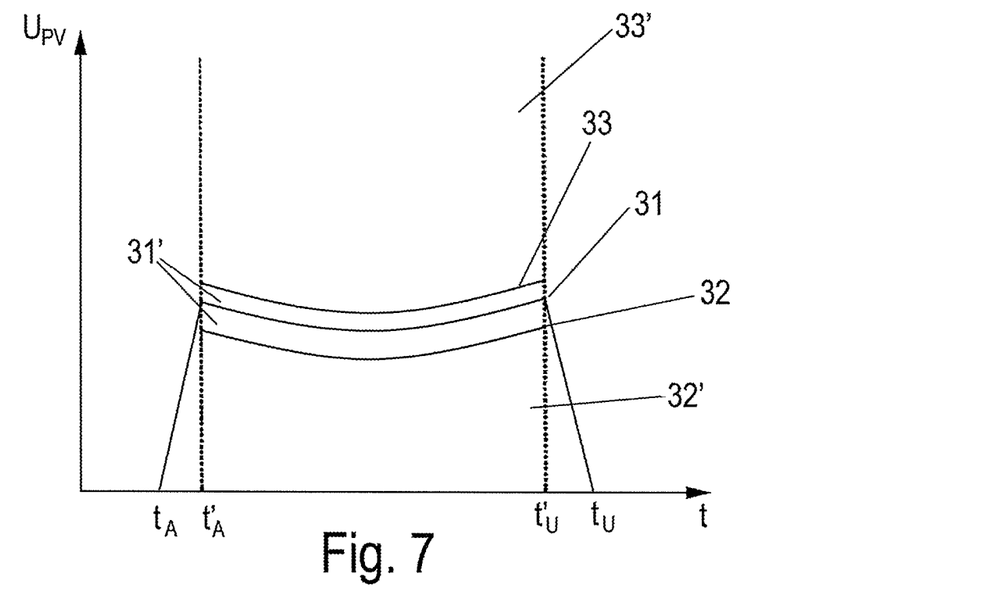
FIG. 7 shows an illustration of an expected profile of a readjusted voltage of a photovoltaic module over the course of the day, in order to illustrate a further embodiment of the method.

FIG. 7 illustrates a further embodiment of a method for operation of a photovoltaic generator PV at its operating point of maximum power.

FIG. 7 shows an expected value curve 31 for the profile of the readjusted voltage $U_{PV}$ of a photovoltaic generator PV over the course of the day. As in the case of FIGS. 4 and 6, the times $t_A$ and $t_U$ indicate sunrise and sunset, respectively. Apart from brief time periods immediately after sunrise and before sunset, the voltage $U_{PV}$ on the expected value curve 31 follows to a first approximation, a parabola which is open at the top. The time of day section for which this assumption is valid is indicated by the times $t'_A$ and $t'_U$. The decrease in the profile over the day around noon is due to changed operating conditions, as a result of heating of the photovoltaic generator. The times $t'_A$ and $t'_U$ as well as the voltage values at these times and at the peak point on the expected value curve 31 can be determined from measured data from one or more of the preceding days, in a similar way to that described in conjunction with FIGS. 4 and 6.

On the basis of the expected value curve 31, two threshold value curves 32 and 33 are determined, for example, by multiplication by a factor of less than unity in the first case and greater than unity in the second case, between which curves 32 and 33 a tolerance range 31' is formed for the voltage $U_{PV}$. A discrepancy in the measured voltage $U_{PV}$ of the photovoltaic generator from this tolerance range 31' into a range 32' below the lower threshold value curve 32, or in a range 33' above the upper threshold value curve 33 indicates an increased probability of the photovoltaic generator being partially shadowed, and of the operating point tracking one of at least two power maxima as a result of the tracking method. There is therefore also an increased probability of the tracking method tracking only a local maximum, rather than a global maximum. According to this refinement, a photovoltaic voltage in the range 32' or 33' is monitored in order to interrupt the tracking method and to carry out a search method. In this case, sensible factors for determining the lower threshold value curve 32 and the top threshold value curve 33 are, for example, 0.9 and 1.05, respectively.

In a similar manner to that in the embodiment described in conjunction with FIG. 5, it is also possible to use a counter here in order to introduce a latency time for the initiation of the search method. In this case, the operating variable on which the method is based, that is to say in this case the voltage of the photovoltaic module, can be used to influence the latency time. For example, a counter decrement per unit time can be chosen to be greater, the greater the discrepancy between the measured voltage $U_{PV}$ of the photovoltaic module and the expected curve 31.

Figure 8:
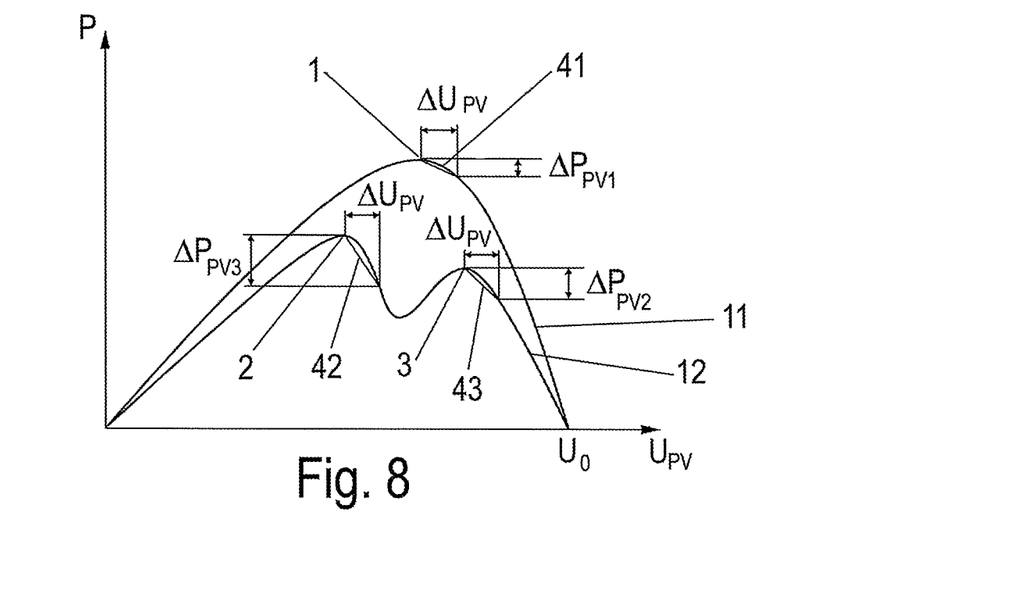
FIG. 8 shows an illustration, in the form of a graph, of P/U characteristics in order to illustrate a further embodiment of the method.

FIG. 8 shows P/U characteristics, in a similar manner to those illustrated in FIG. 1, in order to illustrate a further embodiment of the method. As described in conjunction with FIG. 2, the voltage $U_{PV}$ of the photovoltaic generator is increased or decreased in steps during the tracking method, in order to measure a current value $I_{PV}$ which is then set, and to use this to determine the power value $P_{PV}$. A comparison of the power values before and after changing the voltage $U_{PV}$ forms the basis for the tracking method. In this case, the quotient of the power change and the voltage change $\Delta P_{PV}/\Delta U_{PV}$ indicates the gradient on the flank adjacent to the respective maximum which is being tracked. This gradient is linked to the width of the maximum: a large gradient corresponds to a narrow maximum, and a small gradient to a broad maximum.

FIG. 8 illustrates gradients 41, 42 and 43 determined in this way for the maxima 1, 2 and 3. When a plurality of maxima occur in a P/U characteristic, for example the observed maxima, in this case 2 and 3, in the case of the actual characteristic 12, there is a tendency for them to be narrower than the sole maximum of a P/U characteristic of an unshadowed PV generator, such as the maximum 1 here for the rated characteristic 11. Limit values are defined for the gradients $\Delta P_{PV}/\Delta U_{PV}$ determined in this way during the tracking method, with overshooting of the limit values indicating the presence of shadowing. In this refinement of the method, the search method is correspondingly started when it is observed during the tracking method that the limit value for the gradient has been exceeded on the flank of the maximum on which the tracking method is currently used for tracking the operating point. In this case, the limit values may be dependent on the power, for example by the gradients being determined as a relative change $\Delta P_{PV}/(\Delta U_{PV}*P_{PV})$. As in the embodiments which have already been described, in this case as well, it is possible on the one hand to introduce a latency time and on the other hand to make the magnitude of the latency time dependent on the observed steepness. By way of example, when using a counter to implement a latency time, the counter decrement can be chosen to be dependent on the magnitude of the determined gradient $\Delta P_{PV}/\Delta U_{PV}$. Alternatively, instead of using a gradient, the steepness can also be determined from a determination of higher-order polynomial coefficients (for example the second-order coefficient) of the P/U characteristic 11, 12 in the region of the observed maximum 1, 2, 3.

Figure 9:
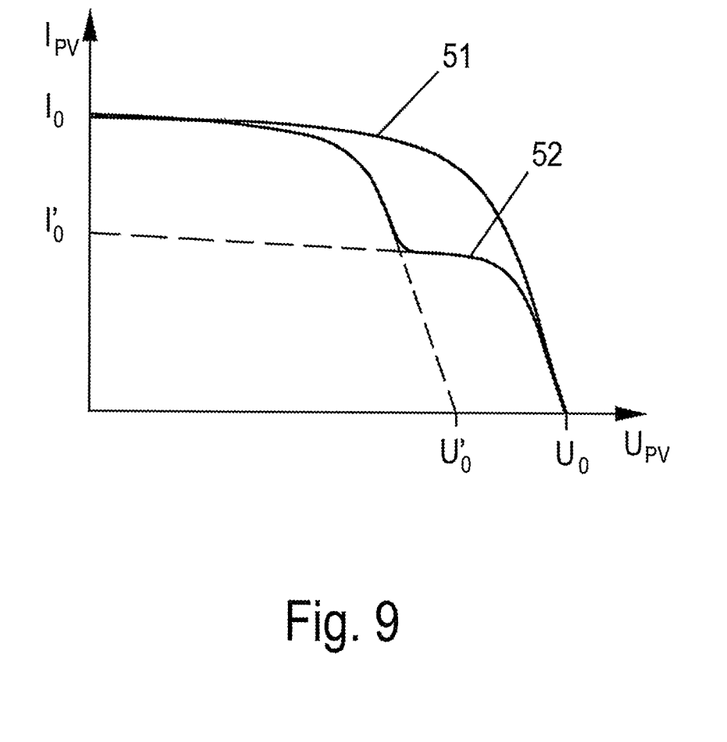
FIG. 9 shows an illustration, in the form of a graph, of I/U characteristics in order to illustrate a further embodiment of the method.

FIG. 9 illustrates a further embodiment of the method using examples of I/U characteristics of a photovoltaic generator. A rated characteristic 51 of an unshadowed PV generator and an actual characteristic 52 of a partially shadowed PV generator are illustrated. The voltage value at which the characteristics 51, 52 intercept the abscissa indicates the no-load voltage $U_0$ of the photovoltaic generator. The current value at which the characteristics 51, 52 intercept the ordinate is referred to as the short-circuit current $I_0$.

If the current and voltage values along the characteristics 51 and 52 are multiplied by one another and are illustrated in the form of a P/U diagram, this results in the characteristics 11 and 12 illustrated in FIG. 1. The shoulders on which the gradients of the characteristics 51 and 52 change from FIG. 9 in this case indicate the positions of the maxima in FIG. 1.

In this embodiment, while carrying out the tracking method, the gradient on the corresponding shoulder of the characteristics 51, 52 is determined analogously to that in the method illustrated in FIG. 7. In a similar manner to the gradient $\Delta P/\Delta U$, the gradients $\Delta I/\Delta U$ are also a measure of the characteristic of the fundamental characteristic. In this case as well, limit values can be defined for the gradients, whose overshooting indicates the presence of partial shadowing. When the limit values are overshot, it can be assumed with a high probability that tracking is taking place on a non-global power maximum. The tracking method is accordingly interrupted, in order to carry out the search method.

Furthermore, in the course of the tracking method, the voltage can be changed toward higher values which, for example, are located further on the right-hand flank adjacent to the corresponding shoulder in the I/U diagram. A variation such as this makes it possible to approximate the right-hand side falling flank in the I/U diagram, and to extrapolate this in the form of a straight line onto the abscissa. In the case of an unshadowed photovoltaic generator, the value at which the extrapolation straight line intercepts the abscissa approximates to the no-load voltage $U_0$ of the photovoltaic generator. When there are a plurality of maxima on the P/U characteristic and a plurality of shoulders on the U/I characteristic in the event of partial shadowing, the extrapolation indicates the respective no-load voltage of that part of the photovoltaic generator which is governing this region of the characteristic.

In the case of the actual characteristic 52 in FIG. 9, the right-hand side extrapolation on the left-hand shoulder leads to a predicted no-load voltage $U'_0$ which can be associated with the shadowed part of the photovoltaic generator. The observation of a no-load voltage $U'_0$ which is considerably below the no-load voltage $U_0$ to be expected once again indicates the presence of partial shadowing. In this case, the no-load voltage $U_0$ can be determined in advance by measurement on the unshadowed photovoltaic generator, or by extrapolation when tracking the shoulder of the rated characteristic 51. A discrepancy between the predicted no-load voltage $U'_0$ and the expected no-load voltage $U_0$ indicates an increased probability of tracking using an operating point which is not the point of maximum power of the photovoltaic generator. The tracking method is correspondingly interrupted, in order to carry out the search method.

In the same way as that it is possible to predict the no-load voltage from a determination of the gradient on the right-hand side flank of the shoulders of an I/U characteristic, an extrapolation of the gradient on the left-hand side flank of the shoulders onto the ordinate analogously makes it possible to deduce a short-circuit current.

In the event of shadowing, the corresponding extrapolation on the right-hand shoulder of the actual curve 52 leads to a predicted short-circuit value $I'_0$ which differs considerably from the expected short-circuit current $I_0$. The short-circuit current $I_0$ can be measured in advance in the unshadowed case, or can be determined by extrapolation when tracking on the shoulder of the rated characteristic 51. An observed discrepancy between a predicted short-circuit value $I'_0$ and the expected short-circuit current $I_0$ is in this case once again an indicator of the presence of partial shadowing. The search method is initiated if a predetermined limit value for the discrepancy is overshot.

As in the already described embodiments, a latency time for initiation of the search method can also be introduced in the embodiments described in conjunction with FIG. 9. The magnitude of the latency time is in this case made dependent, for example, on the determined gradient $\Delta I/\Delta U$, the predicted no-load voltage $U'_0$ or the predicted short-circuit current $I'_0$.

Discrepancies between the predicted no-load voltage $U'_0$ and the predicted short-circuit current $I'_0$ from the respective expected values can also be used in a combined form to initiate the search method.

For this purpose, in a further embodiment of the method, the product of $U'_0$ and $I'_0$ can be formed, and can be compared with the product of the corresponding expected values. A discrepancy between the products is once again an indicator of the presence of partial shadowing. This advantageously allows shadowing to be identified independently of which of two or more maxima is being used by the tracking method to track the operating point.

In the embodiments described so far, the initiation of the search method is based on the evaluation of the operating variables which are recorded while carrying out the tracking method by an appropriate tracking device which, for example, can be integrated in an inverter which is connected to the photovoltaic generator. In addition or as an alternative to such operating variables, it is, however, also possible to take account of externally supplied information and/or operating variables of further photovoltaic generators which are present in a photovoltaic installation, in order to initiate a further run of the search method.

If, for example, the operating variables of a plurality of photovoltaic generators can be determined independently of one another in a photovoltaic installation, a difference in these operating variables, for example a photovoltaic generator power which differs widely from its respective rated power, can be assessed as an indication of possible shadowing, and the tracking method can correspondingly be interrupted, in order to carry out the search method, for that photovoltaic generator which is producing an excessively low relative electrical power. An external trigger signal can be provided in the corresponding inverter in order to initiate the search method, which trigger signal is output from a central device, which monitors the operating variables of the plurality of photovoltaic generators. This can furthermore take account of further externally available information items. For example, it is possible to compare power levels which are being produced by the photovoltaic generators with power levels which can be expected on the basis of the weather data. Any discrepancy observed in this case can likewise be used to initiate the search method.

According to the invention, the success which a search that has been carried out has had in specific (environmental) conditions is taken into account when controlling the initiation of further runs of the search method.

For example, it is possible to enter a successful run of the search method in a solid angle chart. A successful run of a search method is distinguished in that it led to an operating point with a greater yield being found. The search success can be shown on the solid angle chart for example as a function of the incident radiation direction, that is to say where the sun is a function of the date and the time. If information relating to a multiplicity of search methods carried out is entered on the solid angle chart over the course of time, the solid angle chart makes it possible to make a statement for a specific incident radiation direction as to whether and with what probability a further run of the search method would lead to an increase in power. This information can be used directly to initiate a run of the search method, or can be used indirectly in order to influence the initiation of the search method via a change in the latency time in conjunction with one of the already described methods. As an alternative or in addition to information relating to the search success, the new operating point and/or operating variables at the new operating point can also be stored on a solid angle chart such that, over the course of time, the solid angle chart contains more precise information relating to an expected value for the operating point and/or operating variables at the operating point, from which a probability prediction for search success can be derived. The probability prediction can be used, as described above, to decide whether to carry out the search method.

In a further refinement, runs of the search method are carried out cyclically at regular time intervals for a predetermined first time period, for example one day. Depending on how successful the runs were in this time period, the cyclic search is either carried out regularly for a second, longer time period, or is suppressed for the entire duration of the second time period. Once the second time period has elapsed, the search is once again carried out cyclically for the duration of the first time period, its success is assessed, and the method is correspondingly repeated. The probability of the success of a repeated regular search method, which probability varies over the course of the time (of year) is thus determined, and the process of carrying out further search methods is controlled on the basis of this probability.

The invention claimed is:

1. A method for operation of a photovoltaic generator (PV) at an operating point of maximum power, comprising:
    searching for a point of maximum power based on a systematic load variation with a wide variation range;
    setting the point of maximum power as the operating point of the photovoltaic generator (PV) based on the search;
    tracking the operating point based on a load variation with a narrow variation range;
    analyzing operating variables of the photovoltaic generator (PV) in order to determine a level of probability that the operating point deviates from the point of maximum power;
    selectively interrupting the tracking method and carrying out another search in order to determine the point of maximum power as a function of a result of the analysis of the operating variables; and
    setting the point of maximum power as the operating point based on the another search, and resuming the operating point tracking,
    wherein a result of previous searches, which were carried out in the presence of comparable operating variables, is taken into account in determining the probability of the operating point deviating from the point of maximum power.

2. The method as claimed in claim 1, wherein the analyzed operating variables are recorded during the tracking of the operating point.

3. The method as claimed in claim 1, wherein a power and or a voltage and/or a current of the photovoltaic generator are analyzed as an operating variable or operating variables.

4. The method as claimed in claim 1, wherein a tolerance range is predetermined for the operating variables, and wherein the search is started subject to a precondition that the operating variables are outside the tolerance range.

5. The method as claimed in claim 1, wherein a tolerance range is predetermined for a rate of change of one or more operating variables, and wherein the search is started subject to a precondition that the rate of change of the one or more operating variables is outside the tolerance range.

6. The method as claimed in claim 1, wherein a tolerance range is predetermined for a dependency of different operating variables on one another, and wherein the search method is started subject to a precondition that the dependency of the operating variables on one another is outside the tolerance range.

7. The method as claimed in claim 6, wherein the dependency of various operating variables on one another is a quotient of a change of a first operating variable and a change of a second operating variable when the first or second operating variable is varied.

8. The method as claimed in claim 4, wherein a latency time is provided, and the search is started subject to a precondition that the tolerance range is left for a time period that is longer than the latency time.

9. The method as claimed in claim 8, wherein a length of the latency time itself depends on operating variables of the photovoltaic generator (PV).

10. The method as claimed in claim 8, wherein a length of the latency time is determined taking account of the probability.

11. The method as claimed in claim 1, wherein the result of a previous search method is a probability with which the previous searches have each led to setting of a different operating point, taking account of the respective operating variables.

12. The method as claimed in claim 1, wherein parameters of radiation that is incident on the photovoltaic generator are analyzed as an operating variable.

13. The method as claimed in claim 12, wherein the parameters relate to a radiation direction.

14. The method as claimed in claim 13, wherein the radiation direction is determined based on a time.

15. The method as claimed in claim 1, wherein the result of a previous search method is an expected value of the respective new operating point or an expected value of operating variables of the photovoltaic generator at the respective new operating point, with which the previous searches have each led to setting of a different operating point, taking account of the respective operating variables.

16. The method as claimed in claim 15, wherein the determination of the probability being carried out taking account of a discrepancy between the expected value and corresponding operating variables of the photovoltaic generator.

* * * * *